Dec. 24, 1963  G. P. NISSEN ETAL  3,115,260
TRANSPORTING DEVICE
Filed March 26, 1962  2 Sheets-Sheet 1
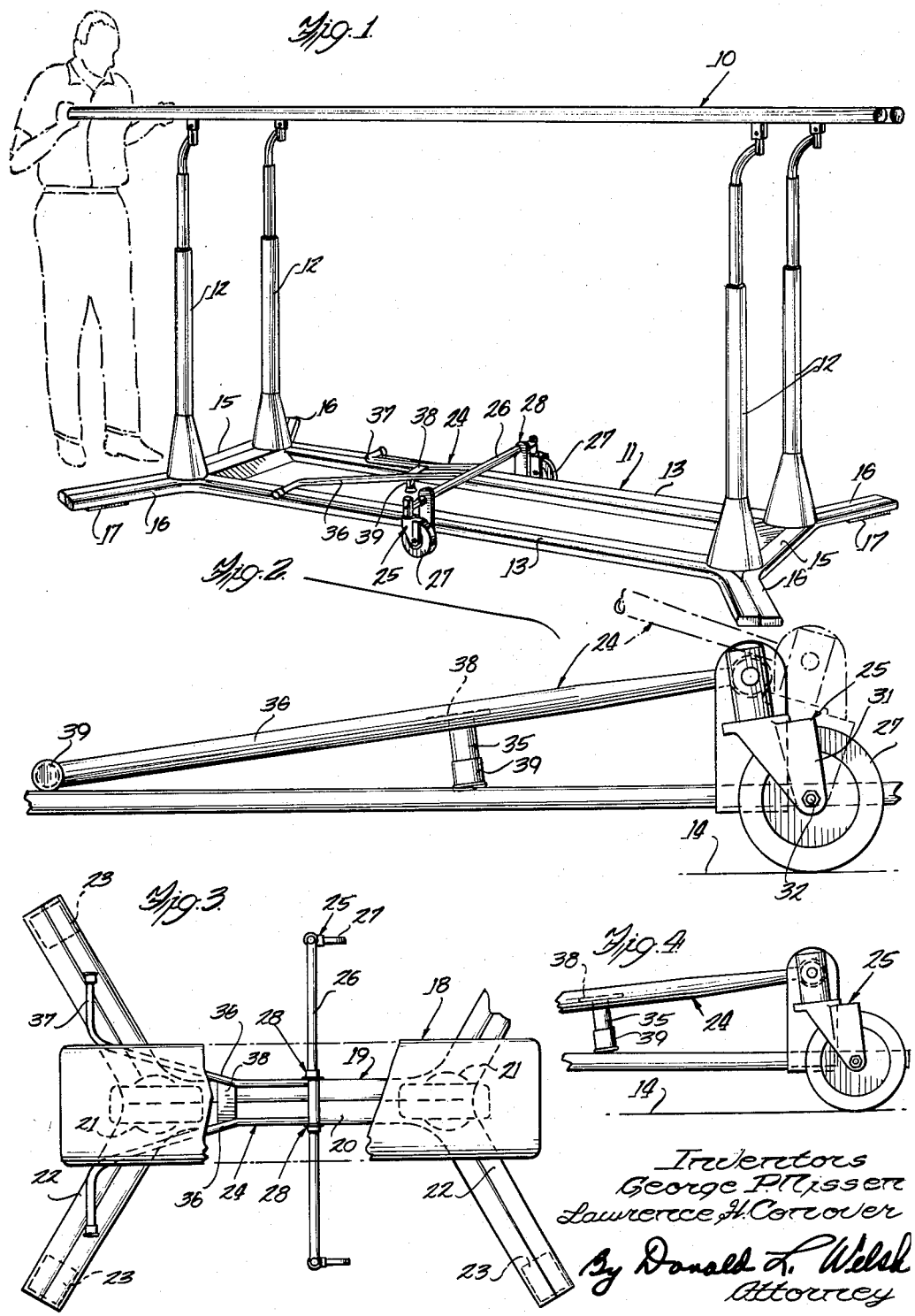

Dec. 24, 1963
G. P. NISSEN ETAL
3,115,260
TRANSPORTING DEVICE
Filed March 26, 1962
2 Sheets-Sheet 2
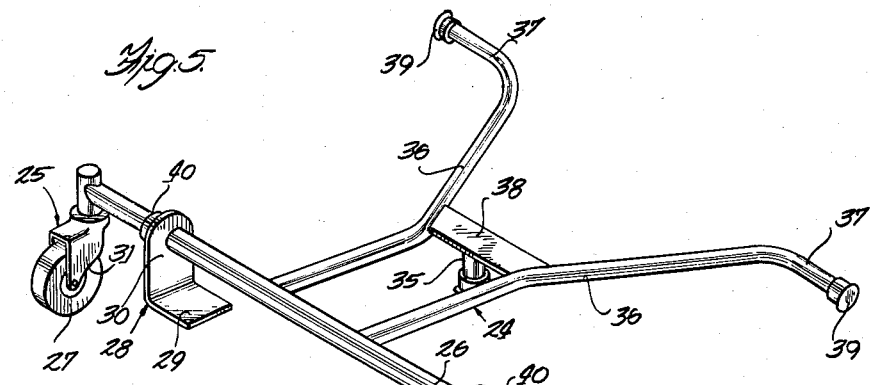
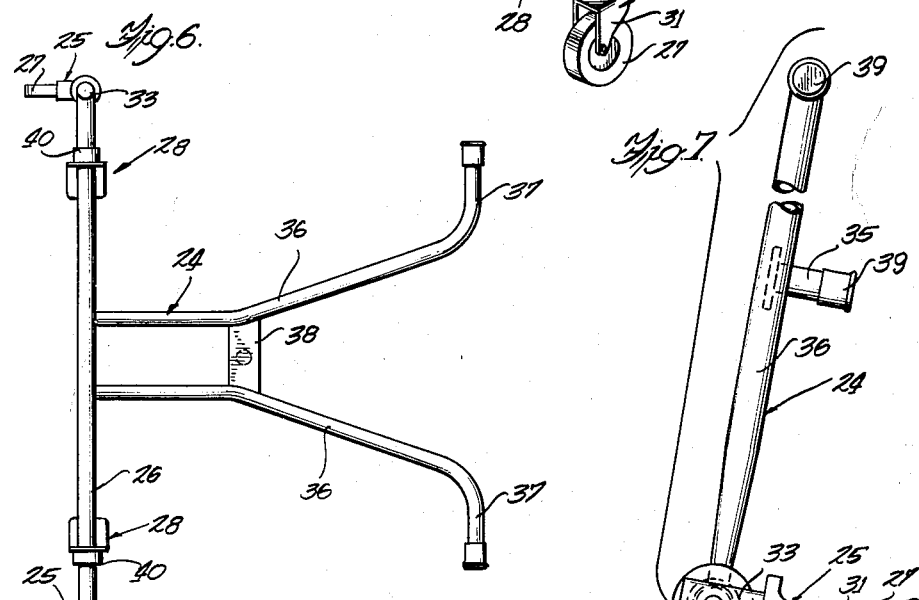
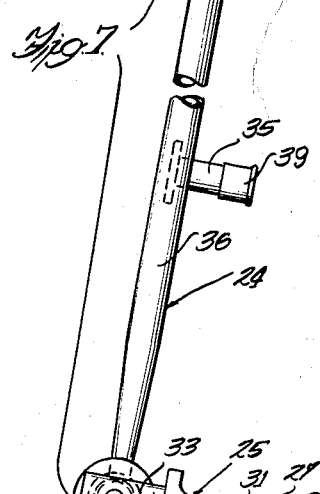
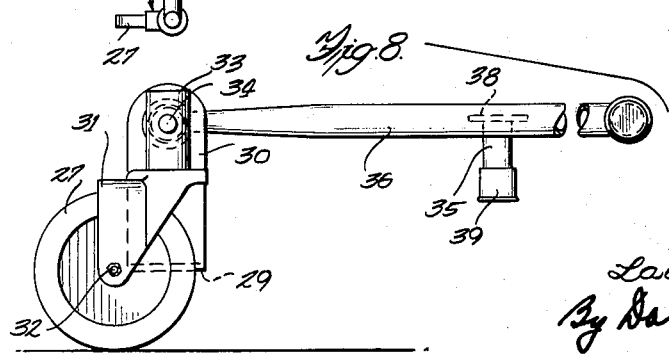

United States Patent Office 3,115,260
Patented Dec. 24, 1963

1

3,115,260
TRANSPORTING DEVICE
George P. Nissen and Lawrence H. Conover, Cedar Rapids, Iowa, assignors to Nissen Corporation, Cedar Rapids, Iowa
Filed Mar. 26, 1962, Ser. No. 182,601
3 Claims. (Cl. 214—378)

This invention relates generally to a device for transporting heavy objects such as pieces of gymnastic apparatus having supporting bases with elongated horizontal parts spaced short distances above a horizontal supporting surface for the apparatus. More particularly, the invention relates to a transporting device of the truck type having spaced wheels rotatably mounted on a horizontal frame member with the handle projecting rigidly from the member and at least one L-shaped bracket slidable along the member and adapted to hook under the horizontal part of the base of the apparatus and raise the same when the handle is moved with an over-center action and into engagement with the part.

One object of the invention is to provide a transporting device of the above character which is constructed in a novel manner enabling the device to be stored easily in an out-of-the-way manner.

A more detailed object is to locate the center of gravity of the device in a novel manner with respect to the wheels and brackets so that, with these parts engaging a horizontal supporting surface, the handle is retained in an upright position of equilibrium.

The invention also resides in the novel contsruction of the handle enabling the same to accommodate different types of apparatus.

Other objectives and advantages of the invention will become apparent from the following detailed description taken in conjunction with the accompanying drawings in which:

FIG. 1 is a perspective view of a transporting device embodying the novel features of the present invention and shown in a transporting position with respect to one type of gymnastic apparatus.

FIG. 2 is a side elevational view of the transporting device as shown in FIG. 1.

FIG. 3 is a fragmentary plan view of the transporting device shown in a transporting position with respect to another type of gymnastic apparatus part of which is broken away.

FIG. 4 is a fragmentary side elevational view of the device as shown in FIG. 3.

FIG. 5 is a perspective view of the transporting device alone but in a transporting position.

FIG. 6 is a plan view of the device in a transporting position.

FIG. 7 is a side elevational view of the device in its storage position, and,

FIG. 8 is a side elevational view of the device alone.

While the invention is susceptible of various modifications and alternative constructions and uses, there is shown in the drawings and will be described herein in detail only one preferred embodiment of the invention. It is to be understood, however, that the aim is not to limit the invention by such disclosure, but, rather, it is to cover all modifications and alternative constructions and uses falling within the spirit and scope of the invention as expressed in the appended claims.

The present invention is especially adapted for use in transporting gymnastic apparatus such as parallel bars 10 (FIG. 1) having a supporting frame comprising a base 11 with upright posts 12 which, at their upper ends are connected to the horizontal parallel bars. Normally, as in this instance, the base includes elongated horizontal members 13 which are spaced a short distance above the floor 14 or any other horizontal supporting surface for the apparatus. In the case of the parallel bars shown in the drawings, each of the base members comprises a pair of parallel tubes of oval cross section and extends longitudinally between a pair of the posts in parallel with the other member. Similar cross members 15 extend between the posts at the ends of the longitudinal members. The outermost tubes of the various members are bent outwardly away from the posts and cooperate with each other to form corner legs 16. Whereas the base may be elevated slightly above the floor by selectively retractable lifts, they are raised in this instance by flat pads 17 of rectangular shape secured to the undersides of the support legs 16.

As in the case of another type of apparatus used in gymnastics a horse 18 shown in FIG. 3, the base 19 may comprise a single longitudinal member 20 formed by a pair of tubes of oval cross section extending between only two posts 21 and bent outwardly to cooperate with tubular end pieces 22 to form corner legs. Pads 23 on the undersides of these legs engage the floor and space the base a short distance above the floor 14, the same as the base 11 of the parallel bars 10.

The transporting device generally is in the form of a truck and comprises a frame of generally L-shape as shown in FIG. 7 having two legs 24 and 25 joined at an elongated horizontal cross bar 26. The longer leg 24 constitutes a handle projecting rigidly from the bar and the other leg 25 is defined by two spaced supports which project laterally from opposite ends of the bar and on which wheels 27 are mounted for rotation about a fixed axis paralleling the bar. Slidable along the bar is at least one pickup bracket 28 also of L-shape with a horizontal leg 29 paralleling the bar and a vertical leg 30 journaled on and slidable along the bar. There preferably are two brackets as in the present instance with their horizontal legs extending toward each other from the vertical legs. For a purpose to appear later, the vertical legs of the brackets are shorter than the miximum height of the bar above the floor when the wheels engage the floor, such maximum height being equal approximately to the sum of the radius of the wheel and the spacing of the bar from the wheel axis.

When it is desired to transport a piece of apparatus such as the parallel bars 10, the wheels 27 are moved astraddle the longitudinal horizontal base members 13 with the lifting brackets 28 located in outer positions adjacent the wheels and on outer sides of the base members. The handle 24 then is raised to revolve the bar 26 about the wheel axis and lower the horizontal bracket legs 29 to a position adjacent or on the floor (see FIG. 7) and beneath the raised longitudinal base members. While the handle is retained in this position, the brackets are shifted along the bar and toward each other until the vertical legs 30 engage the base, the horizontal legs then being disposed beneath or hooked under the base. The handle then is swung downwardly in a direction to raise the bar and the brackets and swing the bar beyond a center position directly above the wheel axis. Movement of the bar beyond this over-center position is limited by engagement of the handle 24 with the longitudinal base members as shown in FIGS. 1 and 2. Because the bar is over or past center, the weight of the apparatus acting on the bar through the bracket legs tends to retain the handle in engagement with the base. Due to the fact that the vertical bracket legs are shorter than the maximum height of the bar, the horizontal legs 29 are disposed above the floor in the over-center position of the bar and thus support the longitudinal base members above the floor. With proper manipulation by an operator at one end of the parallel bars as shown in FIG. 1, the entire apparatus is supported solely by the truck and is spaced above the floor so that it may be moved easily upon rotation of the wheels 27.

In the present instance, each of the wheel supports 25 comprises a forked end 31 straddling the wheel and receiving shafts 32 which rotatably support the wheels 27. The other end of each support is a cylindrical member 33 having its axis offset from the wheel axis and secured as by bolts 34 in recessed ends of the cross bar 26. The connection between the supports and the bar thus is rigid and the axes of the wheels fixed in alignment with each other and in parallelism with the bar.

The present invention, in one of its aspects, contemplates a novel construction of the handle 24 enabling it to accommodate different kinds of apparatus. To this end, the outer end portion of the handle is bifurcated to receive the upstanding post 21 of apparatus such as the horse 18 in FIG. 3 having a single post at one end of a longitudinal frame member 20 rather than the pairs of posts 12 of the parallel bars 10 of FIG. 1. To limit the over-center movement of the cross bar 26 in such a case, a bumper 35 projects laterally from the handle immediate the ends of the handle to engage the single longitudinal extending frame part 20, this engagement being illustrated in FIGS. 3 and 4.

Like the cross bar 26, the handle 24 is formed of hollow tubular material, there being two sections 36 in this instance. At one end, both sections are secured as by welding to the center portion of the cross bar and project rigidly and outwardly therefrom first in parallelism with each other for approximately a half of the handle length and then diverging away from each other to outwardly bent hand gripping parts 37 which are bent laterally to parallel the cross bars. At the point of divergence immediate the handle ends the two pieces are connected rigidly by a flat cross piece 38. The bumper 35 is in the form of a cylindrical stub secured to and projecting laterally from the cross piece. Preferably, bumper cups 39 of a suitable yieldable material such as rubber telescope over the outer ends of the bumper and the handle gripping parts 37 of the handle to avoid marring of the apparatus being transported.

In another aspect, the present invention contemplates a novel correlation of the dimensions of the brackets 28 with the dimensions of the other parts of the truck to enable the brackets to be utilized not only to pick up the supporting base 11 of the gymnastic apparatus, but also, to cooperate with the wheels 27 and maintain the truck in an out-of-the-way storage position with the handle 24 disposed upright as shown in FIG. 7. This is accomplished by extending the handle upwardly from the cross bar 26 at such an angle with respect to the plane defined by the bar and wheel axis that, when the handle is raised to bring the horizontal bracket legs 29 into contact with the floor 14 while the wheels are engaging the floor, the center of gravity of the truck is located vertically above the area defined by the points of contact of the wheels and brackets with the floor. Also, the horizontal bracket legs are flat and are disposed tangentially with respect to the bar, or stated another way, normal to a radius of the bar so as to have line or flat surface contact with the floor. By virtue of such contact and the particular location of the center of gravity of the truck, equilibrium is established when the wheels and brackets engage the floor and the handle is stable in an upright position. The truck then may be stored out of the way, for example, against a vertical wall of a gymnasium or other room where the apparatus is being used.

Each bracket 28, in the present instance, is formed by bending a flat piece of strip stock into an L-shape. To provide a bearing for the vertical leg 30, a sleeve 40 is secured as by welding in a hole the upper end portion in such leg, the sleeve telescoping over the cross bar 26. The desired location of the center of gravity vertically above the area of contact of the wheels and brackets with the floor is obtained by a proper selection of the length of the vertical bracket legs 30, such length being the distance between the axis of the cross bar and the outer sides of the horizontal legs 29 and by extending the handle 24 away from the cross bar and the plane of the bar and the wheel axis at an obtuse angle. Herein such angle is approximately 110 degrees. The length of the vertical leg is slightly greater than the spacing between the bar axis and the wheel axis.

The use of the improved truck in transporting the parallel bars 10 was described above. The truck is used in a similar manner when transporting apparatus such as the horse of FIG. 3, except that the brackets 28 are shifted closer to each other and into engagement with opposite sides of the single longitudinal base member 20 formed by the two oval tubes. Also, the handle 24, by virtue of its bifurcation, straddles one of the posts 21 and, instead of the gripping portions 37 of the handle engaging spaced longitudinal base members, the bumper 35 engages the single longitudinal member to limit the over-center movement of the cross bar as shown in FIG. 4.

After the gymnastic apparatus has been moved to a desired location using the truck, the truck is removed by raising the handle 24 to swing the cross bar 26 back over center, that is, across the vertical through the wheel axis, in a clockwise direction as viewed in FIGS. 2 and 4, and beyond such position to lower the cross bar and horizontal bracket legs 29 until the apparatus rests on the floor 14. The brackets then are shifted horizontally from beneath the longitudinal base members 13 of the apparatus and the truck is lifted away from the apparatus and moved to a desired storage place where the handle 24 is raised to the upright position of FIG. 7 to dispose the horizontal bracket legs in flat contact with the floor. The handle then may be released and, due to location of the center of gravity of the truck above the area defined by the points of contact of the wheels 27 and the brackets with the floor, and due to the flat character and substantial width of the horizontal bracket legs tangentially of the cross bar 26, the truck remains in a stable condition of equilibrium with the handle retained in its out-of-the-way upright position.

We claim:

1. A transporting device for moving an object along a planar supporting surface having, in combination, an elongated bar, a pair of wheels spaced along said bar and mounted thereon to rotate about an axis spaced from the bar, at least one L-shaped bracket having first and second legs, said first leg depending from said bar and being rotatably mounted on said bar between said wheels to swing about the bar in a plane transverse to the bar and to slide along the bar and a second leg paralleling the bar and projecting along the length of the bar, the first leg having a length less than the sum of the radius of said wheel and the spacing between said axis and said bar, and an elongated handle projecting rigidly from said bar and laterally from a plane defined by the bar and said axis, said bar being rotatable by said handle around said axis from a first position in which said L-shaped bracket and wheels rest on said planar supporting surface and said elongated handle extends substantially perpendicular to said surface to a second and overcenter position where the L-shaped bracket is lifted off the supporting surface and the handle extends toward the supporting surface to engage the object being transported to prevent said bracket from engaging said supporting surface.

2. A device of the type described in claim 1 in which the elongated handle projects from the center portion of said bar and the outer end portion of said handle remote from said bar is bifurcated.

3. A device of the type described in claim 1 in which the center of gravity of the device is disposed vertically above an area defined by the points of contact of the bracket and the wheels with the planar supporting surface when the bar is located in said first position.

References Cited in the file of this patent

UNITED STATES PATENTS

| | | |
|---|---|---|
| 2,529,925 | Donalson et al. | Nov. 14, 1950 |
| 2,901,137 | Emert | Aug. 25, 1959 |

FOREIGN PATENTS

| | | |
|---|---|---|
| 1,132,182 | France | Mar. 6, 1957 |